April 30, 1946.  F. B. HERBERT  2,399,437
BLADE SHARPENER FOR LAWN MOWERS
Filed May 17, 1945
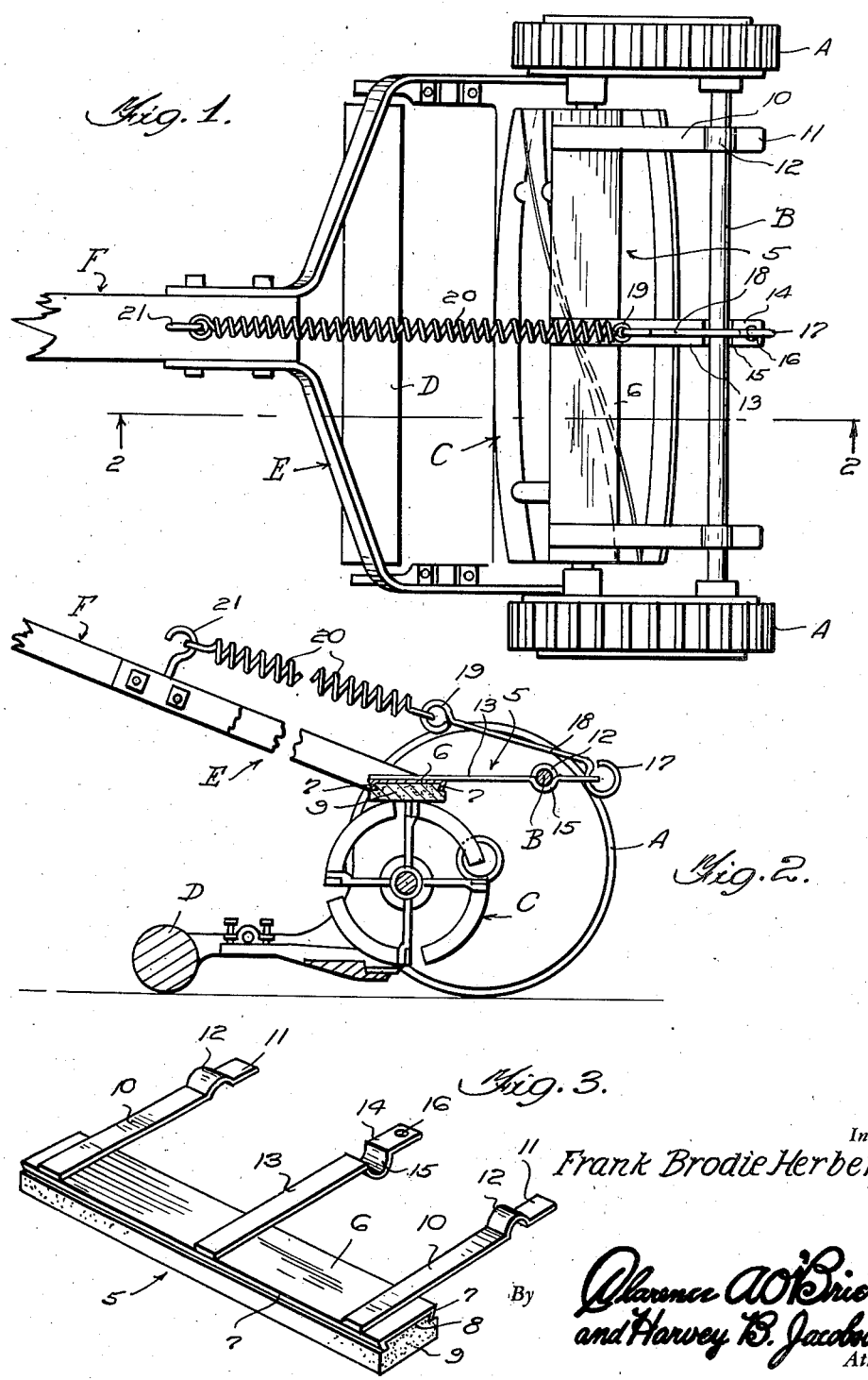
Inventor
Frank Brodie Herbert, Patented Apr. 30, 1946

2,399,437

UNITED STATES PATENT OFFICE 2,399,437

BLADE SHARPENER FOR LAWN MOWERS

Frank Brodie Herbert, Westwood, N. J.

Application May 17, 1945, Serial No. 594,202

3 Claims. (Cl. 51—250)

This invention relates to mower blade sharpeners, particularly the style or type applicable to and usable on standard types of lawn mowers, the primary purpose of the invention being to provide and bring into being a blade sharpener which, compared to those known to me, is possessed of structural refinements and improvements.

Lawn mower blade sharpeners in the above category, generally speaking, are in the form of attachments, these being so made as to be detachably, pivotally, and otherwise mounted on the regular cross-bar, that is, the bar between the ground engaging wheels. These types of sharpeners include abrasive stones, holders for the stones, and ways and means of mounting the holders on said cross-bar.

In carrying out the principles of the present invention, I provide a simple and expedient sheath-like holder, this adapted to removably receive a slab-like stone, said holder being provided at longitudinally spaced points with laterally directed straps or arms, the free ends of the latter being provided with special bends to conform to and satisfactorily mount on said cross-bar.

Novelty is predicated upon the extending strap-arms with semi-circular bends adjacent their free ends, said bends being arranged in predetermined reverse order to properly embrace and clamp the attachment on said cross bar or rod. More specifically, novelty is predicated on an elongated coiled spring fastened at one end on the handle of the lawn mower and secured at its opposite end to the free end of one of said strap-arms.

Other features and advantages will become more readily apparent from the following description and the accompanying illustrative drawing.

In the drawing, wherein like numerals are employed to designate like parts throughout the several views;

Figure 1 is a top plan view of a conventional lawn mower with the blade sharpener attachment thereon, this constructed in accordance with the ideas and principles of the instant invention.

Figure 2 is a longitudinal sectional view passing transversely through the attachment and associated parts, this being on the plane of the line 2—2 of Figure 1, looking in the direction of arrows.

Figure 3 is a perspective view of the attachment per se with the balancing spring removed.

Referring now in detail to the several views and first to Figure 1, it will be seen that the frame includes ground engaging wheels A, a cross-rod or bar B between said wheels, a bladed rotor or reel C, a ground engaging roller D, customary yoke E, and regulation handle F. These are all standard parts.

The sharpener attachment is denoted, generally, by the numeral 5 (see Figure 3). It is characterized, as before indicated, by a sheath-like holder 6, this of metal or equivalent material. It is channel-shaped in cross section and open at its opposite ends and the sides or edge flanges 7 converge. These flanges conveniently grip the dovetail shaped rib or key 8 on the top of the slab-like abrasive stone 9. Thus, the stone can be slipped in or out of the holder from either end. This makes it possible to replace the stone whenever necessary or desired.

The aforementioned strap-like adapter and mounting arms are three in number and the two outer arms 10 are identical and fastened to the opposite end portions of the holder 6. They extend at right angles from the holder in a plane therewith. Adjacent the free outer ends 11, said arms are provided with semi-circular adapter bends 12, these being shaped and proportioned to partially embrace the upper half-portion of the cross-rod B. The middle or intermediate arm is denoted by the numeral 13 and this is formed inwardly of its free end 14 with a semi-circular bend 15 whose convex side is disposed downwardly. Thus, the bend 15 is diametrically opposite to the bends 12 and embraces the under half-portion of cross-rod B. The free end 14 is provided with a hole 16 to accommodate a hook 17 on a link 18, said link terminating at its opposite end in an eye 19 connected to an eye on the coiled tensioning and balancing spring 20. This spring 20 is detachably anchored at its left-hand end to a hook, that is a screw-hook 21 mounted in the handle F.

By way of the arms 10 and 13, and bends 12 and 15, the attachment 5 is rockably mounted on the bar or rod B. It is thus positioned so that the the blades of the reel, sweeping through the regular orbital path, (Figure 3) have wiping contact therewith. Now whereas the attachment 5 is substantially self sustaining, the addition of the spring 20, this properly attached to the handle and to one of the arms 13 adds to the security feature. It causes the attachment 5, as a unit, to fulcrum on the rod B and to hold the stone 9 in effective sharpening contact with the blade edges.

At this point it is to be mentioned that the attachment seen in Figure 3 of the drawing is the same as a corresponding type of sharpening attachment covered in an application for patent filed by me under date of October 28, 1939, identified as Serial No. 301,842, and officially allowed June 10, 1940. It will be noted by comparison with the present case that spring 20 and its attaching parts is an added feature.

A careful consideration of the foregoing description in conjunction with the invention as illustrated in the drawing will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. A sharpener for the knives of the reel of a lawn mower comprising a holder, a stone held by the holder, a pair of flat spring strap members connected respectively to the holder adjacent the ends thereof, said strap members projecting beyond the holder at one marginal side thereof and having substantially semi-circular portions adjacent their free ends which have their concave faces facing downwardly to engage the top of the cross-bar at the front of a lawn mower, and a third flat strap-like member having one end portion connected to the middle of the holder and extending beyond the aforesaid side thereof, said third flat strap member having a semi-circular portion adjacent its free end which has its concave part facing upwardly to engage the under portion of the cross bar, said pair of strap members and said third strap member reacting oppositely for coaction to clamp said cross-bar therebetween.

2. A sharpener for the knives of the reel of a lawn mower comprising a stone holder, an abrasive stone held by the holder, a pair of flat spring strap members connected to the holder adjacent the ends thereof and said strap members projecting beyond the holder at one side thereof and having substantially semi-circular bends adjacent their free ends which have their concave faces facing downwardly to engage the top of the customary cross-bar at the front of a lawn mower, and a third flat strap-like member having one end portion connected to the middle of the holder and extending beyond said side, said third flat strap member having a semi-circular bend adjacent its free end which has its concave part facing upwardly to engage the under portion of the cross bar, said pair of strap members and said third strap member reacting oppositely for coaction to clamp said cross-bar therebetween.

3. A sharpener for the knives of the reel of a lawn mower comprising a holder, a stone held by the holder, a pair of flat spring strap members connected to the holder adjacent the ends thereof and said strap members projecting beyond the holder at one side thereof and having substantially semi-circular portions adjacent their free ends which have their concave faces facing downwardly to engage the top of the cross-bar at the front of a lawn mower, and a third flat strap-like member having one end portion connected to the middle of the holder and extending beyond said side edge thereof, said third flat strap member having a semi-circular portion adjacent its free end which has its concave part facing upwardly to engage the under portion of the cross bar, the pair of strap members and the third strap member reacting oppositely for coaction to clamp said cross-bar therebetween, a coiled spring, a link connected with said spring, said link being provided with a hook, and said hook being connected with the outer end of the third strap-like member.

FRANK BRODIE HERBERT.